(12) United States Patent
Propheter-Hinckley

(10) Patent No.: US 11,092,016 B2
(45) Date of Patent: Aug. 17, 2021

(54) AIRFOIL WITH DUAL PROFILE LEADING END

(71) Applicant: United Technologies Corporation, Farmington, CT (US)

(72) Inventor: Tracy A. Propheter-Hinckley, Rocky Hill, CT (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 77 days.

(21) Appl. No.: 16/589,306

(22) Filed: Oct. 1, 2019

(65) Prior Publication Data

US 2020/0032665 A1 Jan. 30, 2020

Related U.S. Application Data

(63) Continuation of application No. 15/354,096, filed on Nov. 17, 2016, now Pat. No. 10,436,049.

(51) Int. Cl.
*F01D 9/02* (2006.01)
*F01D 5/14* (2006.01)
(Continued)

(52) U.S. Cl.
CPC ............ *F01D 5/147* (2013.01); *F01D 5/189* (2013.01); *F01D 5/282* (2013.01); *F01D 5/284* (2013.01); *F01D 9/042* (2013.01); *F01D 9/065* (2013.01); *F01D 25/005* (2013.01); *F02C 3/04* (2013.01); *F05D 2240/121* (2013.01); *F05D 2260/201* (2013.01); *F05D 2260/202* (2013.01); *F05D 2300/20* (2013.01); *F05D 2300/6033* (2013.01); *Y02T 50/60* (2013.01)

(58) Field of Classification Search
CPC .......... F01D 5/147; F01D 5/189; F01D 5/282; F01D 5/284; F01D 9/042; F05D 2240/121; F05D 2260/201; F05D 2260/202
See application file for complete search history.

(56) References Cited

U.S. PATENT DOCUMENTS 3,215,511 A   11/1965  Chisholm
4,137,008 A   1/1979   Grant et al.
(Continued)

FOREIGN PATENT DOCUMENTS

EP   0764764   3/1997
EP   1764481   3/2007
(Continued)

OTHER PUBLICATIONS

U.S. Appl. No. 13/429,474, filed Mar. 26, 2012.
(Continued)

*Primary Examiner* — Ninh H. Nguyen
(74) *Attorney, Agent, or Firm* — Carlson, Gaskey & Olds, P.C.

(57) ABSTRACT

An airfoil includes first and second endwalls and an airfoil section having a dual airfoil profile. The airfoil section includes a double wall that has an outer wall that defines a primary leading end of the dual airfoil profile and an inner wall spaced from the outer wall. The outer wall is trapped between the first and second endwalls in mortise and tenon joints, and the inner wall defines a secondary leading end of the dual airfoil profile.

15 Claims, 3 Drawing Sheets

(51) Int. Cl.
  *F01D 9/06*   (2006.01)
  *F02C 3/04*   (2006.01)
  *F01D 25/00*  (2006.01)
  *F01D 5/18*   (2006.01)
  *F01D 5/28*   (2006.01)
  *F01D 9/04*   (2006.01)

(56) References Cited

U.S. PATENT DOCUMENTS

| | | | |
|---|---|---|---|
| 4,247,259 A | | 1/1981 | Saboe et al. |
| 4,396,349 A | | 8/1983 | Hueber |
| 4,914,794 A | | 4/1990 | Strangman |
| 5,358,379 A | | 10/1994 | Pepperman et al. |
| 5,538,380 A | | 7/1996 | Norton et al. |
| 5,681,616 A | | 10/1997 | Gupta et al. |
| 5,705,231 A | | 1/1998 | Nissley et al. |
| 5,827,045 A | * | 10/1998 | Beeck ............ F01D 5/284 |
| | | | 416/96 A |
| 5,951,892 A | | 9/1999 | Wolfla et al. |
| 6,000,906 A | | 12/1999 | Draskovich |
| 6,102,656 A | | 8/2000 | Nissley et al. |
| 6,224,963 B1 | | 5/2001 | Strangman |
| 6,316,078 B1 | | 11/2001 | Smialek |
| 6,503,574 B1 | | 1/2003 | Skelly et al. |
| 6,514,046 B1 | | 2/2003 | Morrison et al. |
| 6,543,996 B2 | | 4/2003 | Koschier |
| 6,703,137 B2 | | 3/2004 | Subramanian |
| 6,709,230 B2 | | 3/2004 | Morrison et al. |
| 6,846,574 B2 | | 1/2005 | Subramanian |
| 7,104,756 B2 | | 9/2006 | Harding et al. |
| 7,316,539 B2 | | 1/2008 | Campbell |
| 7,326,030 B2 | | 2/2008 | Albrecht et al. |
| 7,435,058 B2 | | 10/2008 | Campbell et al. |
| 7,452,182 B2 | | 11/2008 | Vance et al. |
| 7,520,725 B1 | | 4/2009 | Liang |
| 7,670,116 B1 | | 3/2010 | Wilson, Jr. et al. |
| 7,963,745 B1 | | 6/2011 | Liang |
| 8,079,806 B2 | | 12/2011 | Tholen et al. |
| 8,182,208 B2 | | 5/2012 | Bridges, Jr. et al. |
| 8,197,211 B1 | | 6/2012 | Liang |
| 8,202,043 B2 | | 6/2012 | McCaffrey |
| 8,215,900 B2 | | 7/2012 | Morrison |
| 8,251,651 B2 | | 8/2012 | Propheter-Hinckley et al. |
| 8,292,580 B2 | * | 10/2012 | Schiavo ............ F01D 5/189 |
| | | | 416/96 A |
| 8,366,392 B1 | | 2/2013 | Laing |
| 8,480,366 B2 | | 7/2013 | Malecki et al. |
| 8,506,243 B2 | | 8/2013 | Strock et al. |
| 8,821,124 B2 | | 9/2014 | Viens et al. |
| 10,215,028 B2 | * | 2/2019 | Schetzel ............ F01D 5/284 |
| 2008/0159850 A1 | | 7/2008 | Tholen et al. |
| 2009/0193657 A1 | * | 8/2009 | Wilson, Jr. ........ F01D 5/20 |
| | | | 29/889.721 |
| 2010/0136258 A1 | | 6/2010 | Strock et al. |
| 2014/0075947 A1 | | 3/2014 | Gautschi et al. |
| 2016/0090851 A1 | | 3/2016 | Carr et al. |

FOREIGN PATENT DOCUMENTS

| | | |
|---|---|---|
| EP | 2105579 | 9/2009 |
| EP | 2853688 | 4/2015 |
| EP | 3000979 | 3/2016 |
| GB | 2272453 | 5/1994 |
| JP | 61066802 | 4/1986 |
| JP | 05321602 | 12/1993 |
| WO | 2014126708 | 8/2014 |
| WO | 2015123006 | 8/2015 |

OTHER PUBLICATIONS

U.S. Appl. No. 14/659,718, filed Mar. 17, 2015.
U.S. Appl. No. 14/812,668, filed Jul. 29, 2015.
European Search Report for European Application No. 17202416.8 dated Jun. 4, 2018.

* cited by examiner

AIRFOIL WITH DUAL PROFILE LEADING END

CROSS-REFERENCE TO RELATED APPLICATION

This application is a continuation of U.S. application Ser. No. 15/354,096 filed Nov. 17, 2016.

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The high pressure turbine drives the high pressure compressor through an outer shaft to form a high spool, and the low pressure turbine drives the low pressure compressor through an inner shaft to form a low spool. The fan section may also be driven by the low inner shaft. A direct drive gas turbine engine includes a fan section driven by the low spool such that the low pressure compressor, low pressure turbine and fan section rotate at a common speed in a common direction.

A speed reduction device, such as an epicyclical gear assembly, may be utilized to drive the fan section such that the fan section may rotate at a speed different than the turbine section. In such engine architectures, a shaft driven by one of the turbine sections provides an input to the epicyclical gear assembly that drives the fan section at a reduced speed.

SUMMARY

An airfoil according to an example of the present disclosure includes an airfoil section that has a dual airfoil profile. The airfoil section includes a double wall that has an outer wall that defines a primary leading end of the dual airfoil profile and an inner wall spaced from the outer wall. The inner wall defines a secondary leading end of the dual airfoil profile.

In a further embodiment of any of the foregoing embodiments, the outer wall is formed of a first material composition, and the inner wall is formed of a second, different material composition.

In a further embodiment of any of the foregoing embodiments, the first material composition is ceramic and the second material composition is metal.

In a further embodiment of any of the foregoing embodiments, the outer wall has an exterior side and an interior side, and the inner wall has a plurality of cooling holes that open to the interior side of the outer wall.

In a further embodiment of any of the foregoing embodiments, the airfoil section includes an internal passage and at least one baffle disposed in the internal passage.

In a further embodiment of any of the foregoing embodiments, the internal passage is adjacent the cooling holes such that the cooling holes open to the internal passage, and the outer wall has a plurality of cooling holes that open on one end to the exterior side of the outer wall and on another end to the interior side of the outer wall.

A further embodiment of any of the foregoing embodiments includes first and second endwall sections. The first and second endwall sections trap the outer wall there between, and at least one of the first or second endwall sections engages the outer wall in a joint. The joint includes a mortise hole and a tenon disposed in the mortise hole.

In a further embodiment of any of the foregoing embodiments, the outer wall is formed of a first material composition. The inner wall is formed of a second, different material composition. The first material composition is ceramic. The second material composition is metal. The outer wall has an exterior side and an interior side, and the inner wall has a plurality of cooling holes that open to the interior side of the outer wall.

An airfoil according to an example of the present disclosure includes first and second endwall sections, and an airfoil section between the first and second endwall sections. The airfoil section has a dual airfoil profile with an outer wall that defines a primary leading end of the dual airfoil profile. The outer wall is formed of a first material composition. The first and second endwall sections trap the outer wall there between. An inner wall defines a secondary leading end of the dual airfoil profile. The inner wall is formed of a second, different material composition.

In a further embodiment of any of the foregoing embodiments, the first material composition is ceramic and the second material composition is metal.

In a further embodiment of any of the foregoing embodiments, the ceramic includes a ceramic matrix composite.

In a further embodiment of any of the foregoing embodiments, the outer wall is spaced apart from the inner wall such that there is an open passage between the inner wall and the outer wall.

In a further embodiment of any of the foregoing embodiments, at least one of the first or second endwall sections engages the outer wall in a joint. The joint includes a mortise hole and a tenon disposed in the mortise hole.

In a further embodiment of any of the foregoing embodiments, the first and second endwall sections also trap the inner wall there between.

In a further embodiment of any of the foregoing embodiments, the outer wall incudes an exterior side and an interior side, and inner wall includes a plurality of cooling holes that open to the interior side of the outer wall.

A gas turbine engine according to an example of the present disclosure includes a compressor section, a combustor in fluid communication with the compressor section, and a turbine section in fluid communication with the combustor. One of the turbine section or the compressor section includes an airfoil that has an airfoil section with a dual airfoil profile. The airfoil section includes a double wall that has an outer wall that defines a primary leading end of the dual airfoil profile, and an inner wall spaced from the outer wall. The inner wall defines a secondary leading end of the dual airfoil profile.

In a further embodiment of any of the foregoing embodiments, the outer wall is formed of a first material composition. The inner wall is formed of a second, different material composition. The first material composition is ceramic, and the second material composition is metal.

In a further embodiment of any of the foregoing embodiments, the outer wall has an exterior side and an interior side, and the inner wall has a plurality of cooling holes that open to the interior side of the outer wall.

A further embodiment of any of the foregoing embodiments includes first and second endwall sections. The first and second endwall sections trap the outer wall there between.

In a further embodiment of any of the foregoing embodiments, the first and second endwall sections also trap the inner wall there between.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
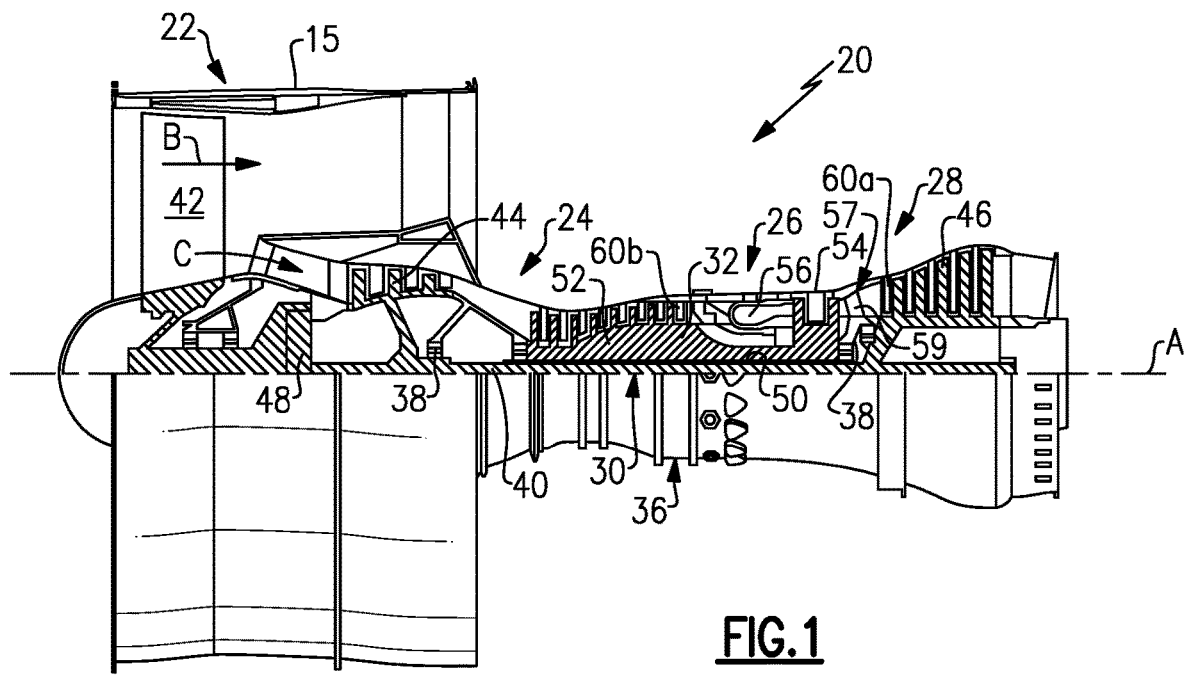
FIG. 1 illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engine designs can include an augmentor section (not shown) among other systems or features.

The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, the examples herein are not limited to use with two-spool turbofans and may be applied to other types of turbomachinery, including direct drive engine architectures, three-spool engine architectures, and ground-based turbines.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 may be connected to the fan 42 through a speed change mechanism, which in exemplary gas turbine engine 20 is illustrated as a geared architecture 48, to drive the fan 42 at a lower speed than the low speed spool 30.

The high speed spool 32 includes an outer shaft 50 that interconnects a second (or high) pressure compressor 52 and a second (or high) pressure turbine 54. A combustor 56 is arranged between the high pressure compressor 52 and the high pressure turbine 54. A mid-turbine frame 57 of the engine static structure 36, if included, is arranged generally between the high pressure turbine 54 and the low pressure turbine 46. The mid-turbine frame 57 further supports the bearing systems 38 in the turbine section 28. The inner shaft 40 and the outer shaft 50 are concentric and rotate via bearing systems 38 about the engine central longitudinal axis A, which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines, including direct drive turbofans and gas turbines with multiple bypass streams.

A significant amount of thrust is provided by the bypass flow B due to the high bypass ratio. The fan section 22 of the engine 20 may be designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram° R)/(518.7° R)]^{0.5}$. The "Low corrected fan tip speed" as disclosed herein according to one non-limiting embodiment is less than about 1150 ft/second.

In gas turbine engines air is often bled from the compressor for cooling components in the turbine that cannot withstand stoichiometric ideal temperatures of fuel burn; however, compressor bleed penalizes engine efficiency. Efficiency is governed by thermodynamics and mass flow through the turbine. Efficiency can generally be increased by lowering volume of compressor bleed, increasing velocity of compressor bleed, or increasing temperature of compressor bleed. These goals are challenging to meet because compressor bleed relies on the pressure differential between the compressor and the turbine. That is, the goals of lower volume, increased velocity, and increased temperature of compressor bleed are generally opposite to the goals of high pressure and low temperature compressor bleed desired for achieving good pressure differential. In this regard, to facilitate overcoming such challenges, an approach taken in this disclosure is to reduce the need for compressor bleed and cooling by enhancing the temperature resistance capability of the turbine or other components exposed to high temperatures. In particular, thermal resistance can be enhanced at the compressor exit and turbine inlet.

Figure 2:
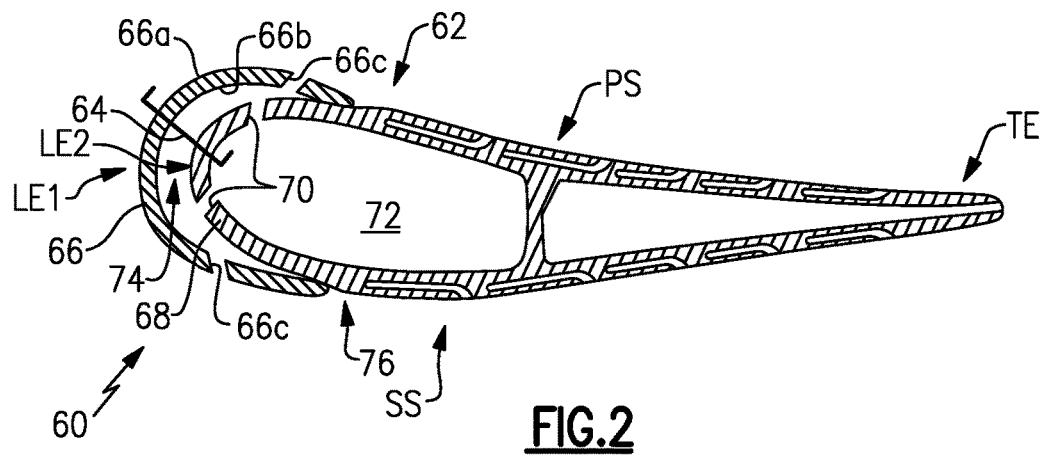
FIG. 2 illustrates an example airfoil in the gas turbine engine.

FIG. 2 illustrates a sectioned view of an example airfoil 60 used in the engine 20. For instance, the airfoil 60 can be a turbine vane, as represented at 60a in FIG. 1, or a compressor vane, as represented at 60b in FIG. 1. As will be appreciated, although the examples herein may be described in the context of a vane, this disclosure is not limited to vanes, and the examples may also be applicable to blades or other airfoils that are exposed to high temperatures.

The airfoil 60 includes an airfoil section 62 that has a dual airfoil profile, which is the peripheral shape of the airfoil section 62 when viewed in a radial direction (as in FIG. 2). For example, the airfoil profile has a wing-like shape that provides a reaction force via Bernoulli's principle with regard to flow over the airfoil section 62. The dual airfoil profile generally includes a primary leading end (LE1), a secondary leading end (LE2), a trailing end (TE), a pressure side (PS), and a suction side (SS). For example, a leading end (LE) is a region of the airfoil profile (AP) that includes a leading edge of the airfoil profile (AP), and a trailing end (TE) is a region of the airfoil profile that includes a trailing edge. The leading edge may be the portion of the airfoil profile (AP) that first contacts air or the foremost edge of the airfoil profile (AP). The trailing edge may be the portion of the airfoil profile (AP) that last contacts air or the aftmost edge of the airfoil profile (AP). For a variable vane, the leading edge may shift, depending on the orientation of the vane.

The airfoil section 62 includes a double wall 64, which provides the dual airfoil profile. The double wall 64 has an outer wall 66 and an inner wall 68. As an example, the outer wall 66 is a separate and distinct piece from the inner wall 68 and is separable from the inner wall 68. The outer wall 66 defines the primary leading end (LE1), and the inner wall 68 defines the secondary leading end (LE2), which will be described in more detail below.

In this example, the outer wall 66 has an exterior side 66a and an interior side 66b. The inner wall 68 has a plurality of cooling holes 70 that open to the interior side 66b of the outer wall 66. As an example, a wall may include a substantially continuous and substantially uniform thickness structure that is self-supporting. A wall may also include one or more coating layers, which are considered to be part of the wall and surfaces of the wall.

The outer wall 66 is formed of a first material composition and the inner wall 68 is formed of a second, different material composition. The "composition" refers to the elemental chemical make-up (e.g., silicon carbide (SiC), alumina ($Al_2O_3$), nickel alloy, cobalt, etc.). In one example, the compositions that are different may have distinct phases or portions that have the same chemistry (e.g., the same oxide or carbide) but that also have phases or portions that have dissimilar chemistry (e.g., oxide versus carbide). In a further example, the compositions that are different have entirely different chemistry, with no phases or portions that have a common chemistry (e.g., metal versus ceramic).

The outer wall 66 serves as the initial or primary leading end (LE1) of the airfoil profile. The inner wall 68 serves as the secondary leading end (LE2) of the airfoil profile upon loss of the outer wall 66. For instance, to enhance thermal resistance, the first composition of the outer wall 66 is ceramic. The ceramic may include, but is not limited to, oxides, carbides, nitrides, borides, silicides, and combinations thereof. A ceramic is a compound of metallic or metalloid elements bonded with nonmetallic elements or metalloid elements primarily in ionic or covalent bonds. In further examples, the ceramic is a monolithic ceramic or a ceramic matrix composite (CMC). For example, a monolithic ceramic is composed of a single, homogenous ceramic material. In comparison, a composite is composed of two or more materials that are individually easily distinguishable. A CMC has a reinforcement phase, such as ceramic or carbon fibers, dispersed in a ceramic matrix formed of oxides, carbides, nitrides, borides, silicides, or combinations thereof.

Although the ceramic has good thermal resistance, in comparison nickel alloys for example, the conditions at the primary leading end (LE1) may be severe. Over time the outer wall 66 may erode and/or corrode, resulting in partial or full loss of the outer wall 66. Upon loss of the outer wall 66, the inner wall 68 also has an aerodynamic geometry, which then serves as the secondary leading end (LE2) of the airfoil profile. For example, the second composition of the inner wall 68 is metal, which may provide good strength. Example metals may include, but are not limited to, nickel alloys, cobalt alloys, a nickel alloy coated with cobalt or cobalt alloy, or non-nickel alloys that do not substantially react with ceramic.

Once exposed, the cooling holes 70 in the inner wall 68 serve to provide cooling bleed air over the outside surface of the inner wall 68. In this regard, the airfoil 60 includes an internal passage 72 adjacent the inner wall 68. Cooling bleed air can be provided through the passage 72 to the cooling holes 70.

Prior to the inner wall 68 being exposed by loss of the outer wall 66, the cooling holes 70 may serve to facilitate cooling of the outer wall 66, if needed. For instance, the outer wall 66 and the inner wall 68 are spaced apart such that there is a passage 74 between the outer wall 66 and the inner wall 68. The cooling holes 70 open to the passage 74. Cooling bleed air from the passage 72 may be provided through the cooling holes to impinge upon the interior side 66b of the outer wall 66. The outer wall 66 may have cooling holes 66c to discharge the cooling bleed air from the passage 74 into the core gas path. Additionally or alternatively, a hole or slot may be provided at an interface 76 of the outer wall 66 and the inner wall 68 to discharge the cooling bleed air for film cooling of the pressure side (PS) and/or suction side (SS).

Figure 3A:
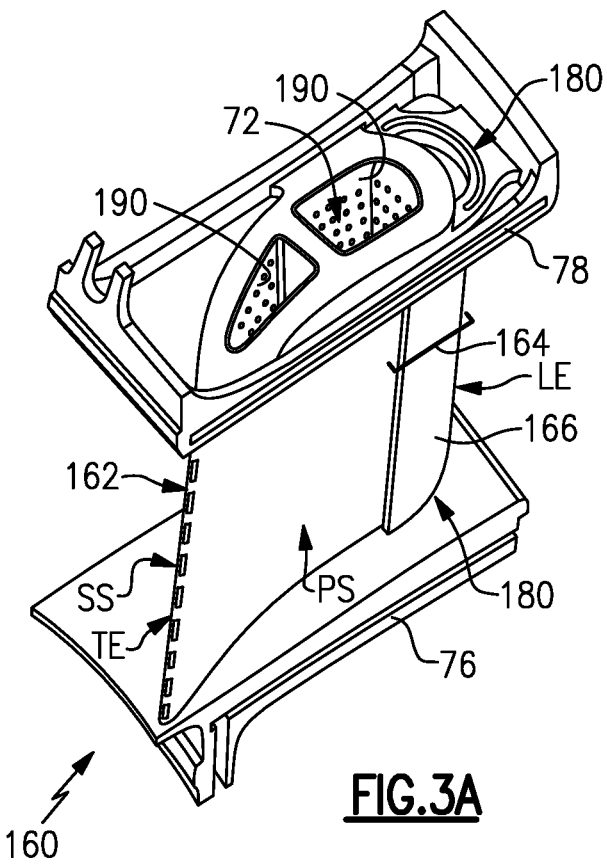
FIG. 3A illustrates another example airfoil.
Figure 3C:
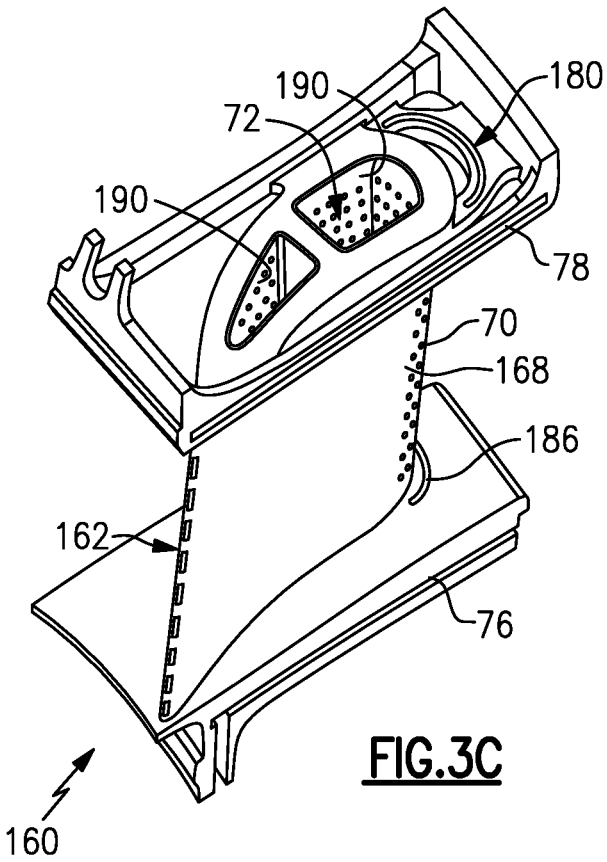
FIG. 3C illustrates the airfoil of FIG. 3A, but without the outer wall.
Figure 3B:
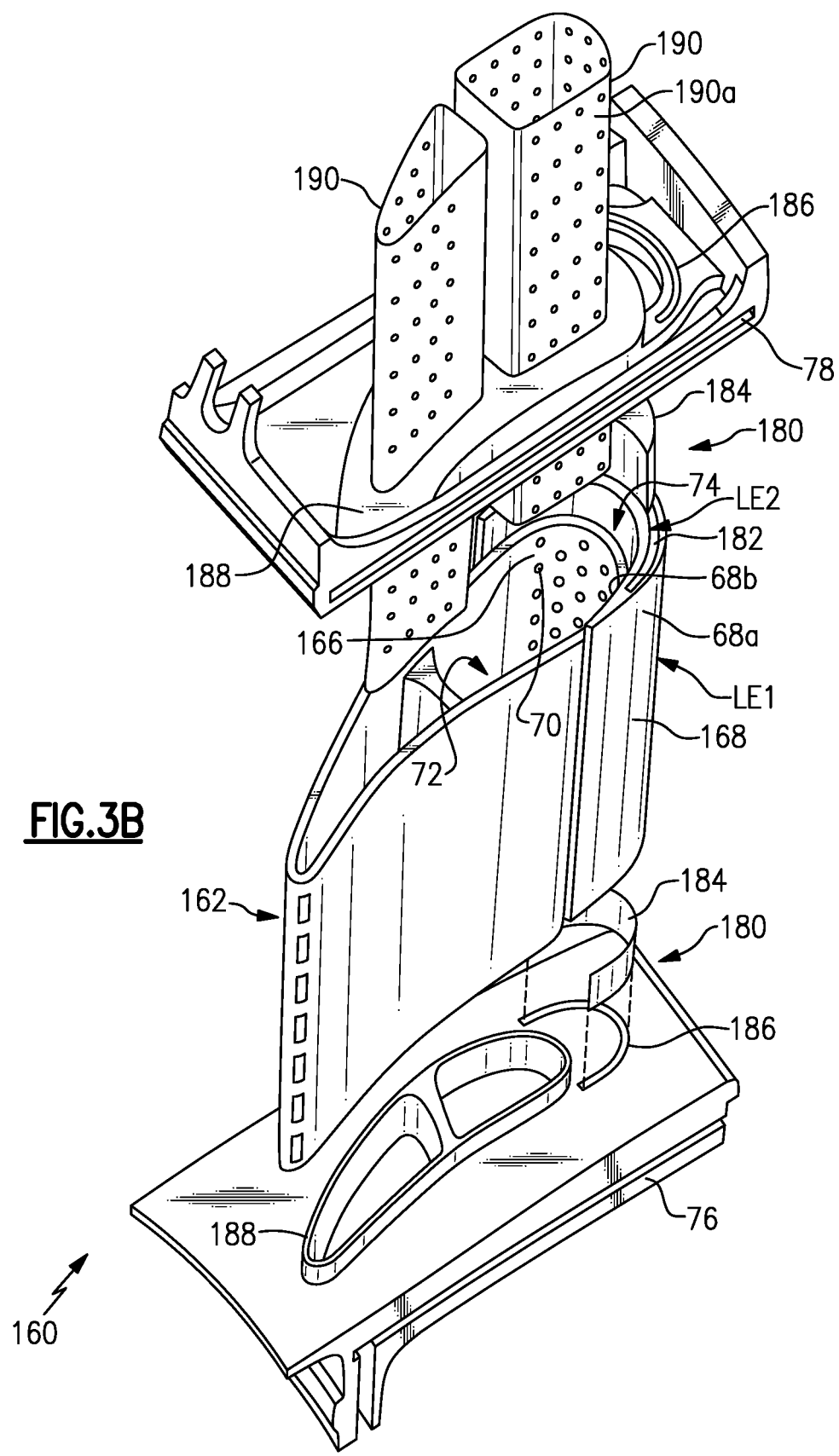
FIG. 3B illustrates an exploded view of the airfoil in FIG. 3A.

FIG. 3A illustrates another example airfoil 160, and FIG. 3B illustrates an exploded view of the airfoil 160. In this disclosure, like reference numerals designate like elements where appropriate and reference numerals with the addition of one-hundred or multiples thereof designate modified elements that are understood to incorporate the same features and benefits of the corresponding elements. In this example, the airfoil 160 includes first and second endwall sections 76/78, and an airfoil section 162 that extends between the endwall sections 76/78. Similar to the airfoil 60, the airfoil section 162 includes a double wall 164. The double wall 164 includes an outer wall 166 formed of the first material composition as described above and an inner wall 168 (FIG. 3C, showing the airfoil 160 without the outer wall 166) formed of the second material composition as described above. Most typically, the outer wall 166 will be ceramic and the inner wall 168 will be metal. Like the prior example, the outer wall 166 defines the primary leading end (LE1), and the inner wall 168 defines the secondary leading end (LE2).

In this example, the endwall sections 76/78 trap the outer wall 168 there between (between the endwall sections 76/78), thereby retaining the outer wall 166 in a fixed or substantially fixed position. In this regard, at least one of the endwall sections 76/78 engages the outer wall 166 in a joint 180. In this example, both of the endwall sections 76/78 engage the outer wall in joints 180.

The joint 180 includes a mortise hole 182 and a tenon 184 disposed in the mortise hole 182. In this example, the mortise hole 182 is in the outer wall 166. The endwall sections 76/78 include respective slots 186. Each tenon 184 is received into the corresponding slot 186 in the endwall sections 76/78. The tenon 184 thus interlocks with the mortise hole 182 and the slot 186, thereby anchoring the outer wall 166 in place. The slots 186 may be sealed, such as by welding, to seal off the endwall sections 76/78 from the core gas path. In this regard, should the outer wall 166 be lost, partially lost, or damaged, the airfoil 160 can be disassembled and a new outer wall 166 may be installed. In the meantime (if the outer wall 166 is fully or partially lost), the inner wall 168 serves as the leading end (LE). Accordingly, the outer wall 166 can be produced individually as a new part for an original airfoil or as a replacement part in an existing airfoil.

In the illustrated example, the inner wall 168 is a separate, distinct piece from the endwall sections 76/78. As shown, the inner wall 168 also extends rearwards to provide the pressure side (PS), the suction side (SS), and the trailing end (TE). Alternatively, the inner wall 168 piece could exclude any of the pressure side (PS), the suction side (SS), or the trailing end (TE). The pressure side (PS), the suction side (SS), and/or the trailing end (TE) may be provided as their own distinct pieces or portions that are integral with either of the endwall sections 76/78. In another alternative, the inner wall 168 may be provided as an integral portion of either of the endwall sections 76/78

If the inner wall 168 is a separate distinct piece as in the illustrated example, the endwall sections 76/78 may also trap the inner wall 168 there between. For instance, the endwall sections 76/78 includes connection features 188 for interlocking with the inner wall 168. As an example, the connection features 188 are recessed cavities in the endwall sections 76/78, raised bosses on the endwall section 76/78, or a combination thereof.

In the illustrated example, the airfoil 160 also includes one or more baffles 190. For instance, the baffle 190 is disposed in the passage 72 adjacent the inner wall 168 and cooling holes 70. The baffle 190 includes holes 190a that facilitate distribution of cooling bleed air in the passage 72.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. An airfoil comprising:
   first and second endwalls;
   an airfoil section having a dual airfoil profile, the airfoil section including a double wall having
      an outer wall that defines a primary leading end of the dual airfoil profile, the outer wall being trapped between the first and second endwalls in mortise and tenon joints, each of the mortise and tenon joints includes a slot in one of the first or second endwalls, the slot opens toward the outer wall, a mortise hole in the outer wall opposite the slot that opens toward the slot, and a tenon disposed in the mortise hole and the slot, thereby anchoring the outer wall to the one of the first or second endwalls, and
      an inner wall spaced from the outer wall, and the inner wall defines a secondary leading end of the dual airfoil profile.

2. The airfoil as recited in claim 1, wherein the outer wall is formed of a first material composition, and the inner wall is formed of a second, different material composition.

3. The airfoil as recited in claim 2, wherein the first material composition is ceramic and the second material composition is metal.

4. The airfoil as recited in claim 1, wherein the outer wall has an exterior side and an interior side, and the inner wall has a plurality of cooling holes that open to the interior side of the outer wall.

5. The airfoil as recited in claim 1, wherein the outer wall is formed of a first material composition, the inner wall is formed of a second, different material composition, the first material composition is ceramic, the second material composition is metal, the outer wall has an exterior side and an interior side, and the inner wall has a plurality of cooling holes that open to the interior side of the outer wall.

6. The airfoil as recited in claim 1, wherein the slot is sealed by welding.

7. The airfoil as recited in claim 1, wherein the slot and the mortise hole are curved.

8. The airfoil as recited in claim 1, wherein the slot and the mortise hole are C-shaped.

9. The airfoil as recited in claim 1, wherein the dual airfoil profile has a pressure side and a suction side, and the slot and the mortise hole curve from the suction side and around the primary leading end to the pressure side.

10. The airfoil as recited in claim 1, wherein the dual airfoil profile has a pressure side and a suction side, and the outer wall is C-shaped such that the tip edges of the outer wall terminate at the pressure side and the suction side, respectively.

11. A gas turbine engine comprising:
    a compressor section;
    a combustor in fluid communication with the compressor section; and
    a turbine section in fluid communication with the combustor,
    at least one of the turbine section or the compressor section including an airfoil having first and second endwalls, an airfoil section having a dual airfoil profile, the airfoil section including a double wall having
an outer wall that defines a primary leading end of the dual airfoil profile, the outer wall being trapped between the first and second endwalls in mortise and tenon joints, each of the mortise and tenon joints includes a slot in one of the first or second endwalls, the slot opens toward the outer wall, a mortise hole in the outer wall opposite the slot that opens toward the slot, and a tenon disposed in the mortise hole and the slot, thereby anchoring the outer wall to the one of the first or second endwalls, and
an inner wall spaced from the outer wall, and the inner wall defines a secondary leading end of the dual airfoil profile.

12. The gas turbine engine as recited in claim 11, wherein the outer wall is formed of a first material composition, the inner wall is formed of a second, different material composition, the first material composition is ceramic, and the second material composition is metal.

13. The gas turbine engine as recited in claim 12, wherein the outer wall has an exterior side and an interior side, and the inner wall has a plurality of cooling holes that open to the interior side of the outer wall.

14. The gas turbine engine as recited in claim 13, further comprising first and second endwall sections, the first and second endwall sections trapping the outer wall there between.

15. The gas turbine engine as recited in claim 14, wherein the first and second endwall sections also trap the inner wall there between.

* * * * *